(12) United States Patent
Kim et al.

(10) Patent No.: US 7,874,940 B2
(45) Date of Patent: Jan. 25, 2011

(54) EXTRUSION METHOD FOR MAKING GOLF BALLS

(75) Inventors: Hyun Kim, Carlsbad, CA (US); Dean A. Snell, San Marcos, CA (US); Sanjay Kuttappa, Oceanside, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 754 days.

(21) Appl. No.: 11/486,938

(22) Filed: Jul. 13, 2006

(65) Prior Publication Data

US 2007/0015605 A1 Jan. 18, 2007

Related U.S. Application Data

(60) Provisional application No. 60/699,303, filed on Jul. 13, 2005.

(51) Int. Cl.
*A63B 37/06* (2006.01)
(52) U.S. Cl. .................................................. 473/377
(58) Field of Classification Search .............. 473/377, 473/351
See application file for complete search history.

(56) References Cited

U.S. PATENT DOCUMENTS

| | | | |
|---|---|---|---|
| 4,115,475 A | 9/1978 | Foy et al. |
| 4,123,061 A | 10/1978 | Dusbiber |
| 4,153,772 A | 5/1979 | Schwesig et al. |
| 4,183,876 A | 1/1980 | Coran et al. |
| 4,195,015 A | 3/1980 | Deleens et al. |
| 4,230,838 A | 10/1980 | Foy et al. |
| 4,331,786 A | 5/1982 | Foy et al. |
| 4,332,920 A | 6/1982 | Foy et al. |
| 4,546,980 A | 10/1985 | Gendreau et al. |
| 4,726,590 A | 2/1988 | Molitor |
| 4,728,693 A | 3/1988 | Droscher et al. |
| 4,755,552 A | 7/1988 | Jadamus et al. |
| 4,792,141 A | 12/1988 | Llort |
| 4,838,556 A | 6/1989 | Sullivan |
| 4,840,993 A | 6/1989 | Bartz |
| 4,844,471 A | 7/1989 | Terence et al. |
| 4,852,884 A | 8/1989 | Sullivan |
| 4,955,966 A | 9/1990 | Yuki |
| 5,334,673 A | 8/1994 | Wu |
| 5,385,776 A | 1/1995 | Maxfield et al. |
| 5,436,295 A | 7/1995 | Nishikawa et al. |
| 5,460,367 A | 10/1995 | Horiuchi |
| 5,948,862 A | 9/1999 | Sano et al. |
| 5,959,059 A | 9/1999 | Vedula et al. |
| 6,012,991 A | 1/2000 | Kim et al. |
| 6,100,321 A | 8/2000 | Chen |
| 6,180,722 B1 | 1/2001 | Dalton et al. |

(Continued)

OTHER PUBLICATIONS

U.S. Appl. No. 10/926,509, filed Aug. 25, 2004, Kim et al.

(Continued)

*Primary Examiner*—Raeann Trimiew
(74) *Attorney, Agent, or Firm*—Klarquist Sparkman, LLP

(57) ABSTRACT

The present invention relates to a method for making golf balls by an extrusion molding process, particularly forming golf ball cores from an extrusion moldable composition. The present invention also relates to a golf ball having an extruded core, an outer cover layer and, optionally, one or more inner cover layers.

17 Claims, 2 Drawing Sheets

U.S. PATENT DOCUMENTS

| | | |
|---|---|---|
| 6,329,458 B1 | 12/2001 | Takesue et al. |
| 6,426,387 B1 | 7/2002 | Kim |
| 6,485,378 B1 | 11/2002 | Boehm |
| 6,508,724 B2 | 1/2003 | Dalton |
| 6,562,906 B2 | 5/2003 | Chen |
| 6,569,037 B2 | 5/2003 | Ichikawa et al. |
| 6,616,552 B2 | 9/2003 | Takesue et al. |
| 6,692,379 B2 | 2/2004 | Morgan et al. |
| 6,762,244 B2 | 7/2004 | Rajagopalan et al. |
| 6,770,360 B2 | 8/2004 | Mientus et al. |
| 6,776,942 B2 | 8/2004 | Kim |
| 6,794,447 B1 | 9/2004 | Kim et al. |
| 6,812,276 B2 | 11/2004 | Yeager |
| 6,835,146 B2 | 12/2004 | Jordan et al. |
| 6,861,474 B2 | 3/2005 | Kim |
| 6,878,075 B2 | 4/2005 | Kim |
| 6,905,423 B2 | 6/2005 | Morgan et al. |
| 6,930,150 B2 | 8/2005 | Kim |
| 6,960,629 B2 | 11/2005 | Voorheis et al. |
| 7,041,769 B2 | 5/2006 | Wu et al. |
| 2002/0040111 A1 | 4/2002 | Rajagopalan |
| 2003/0119989 A1 | 6/2003 | Ladd et al. |
| 2003/0158312 A1 | 8/2003 | Chen |
| 2003/0224871 A1 | 12/2003 | Kim et al. |
| 2004/0044136 A1* | 3/2004 | Kim .......................... 525/192 |
| 2004/0092336 A1 | 5/2004 | Kim et al. |
| 2005/0059756 A1 | 3/2005 | Kim et al. |
| 2005/0148725 A1* | 7/2005 | Statz et al. .................. 524/523 |

OTHER PUBLICATIONS

U.S. Appl. No. 10/662,619, filed Dec. 9, 2004, Kim et al.
U.S. Appl. No. 11/182,170, filed Jul. 14, 2005, Kim.
http://www.chemsoc.org/chembytes/ezine/2002/birkett_july02. htm (accessed on Nov. 1, 2006).
http://bppetrochemicals.com (accessed on Nov. 1, 2006) (http://bp.com/modularhome.do?categoryId=6110).
http://www.nml.csir.co.za/news/20020711/index1.htm (accessed on May 29, 2007).
Research disclosure 29703, published in Jan. 1989.

\* cited by examiner

EXTRUSION METHOD FOR MAKING GOLF BALLS

This application claims the benefit of the earlier filing date of U.S. Provisional Application No. 60/699,303, filed on Jul. 13, 2005. The entire disclosure of provisional application No. 60/699,303 is considered to be part of the disclosure of the accompanying application and is incorporated herein by reference.

FIELD

The present application concerns embodiments of a method for making golf balls, particularly an extrusion method for making golf ball components, such as golf ball cores, particularly ball cores comprising thermoplastic materials, and golf balls made according to the method.

BACKGROUND

A. Golf Ball Construction and Composition

Modern golf balls generally are either one-piece or multiple-piece constructions. One-piece balls, molded from a homogeneous mass of material with a dimple pattern, are inexpensive and very durable, but do not provide great distance because of relatively high spin and low velocity. Two-piece balls are made by injection or compression molding a cover around a solid, often single-piece, spherical rubber core. Hard ionomer thermoplastic resins are common materials used to form cover layers about the core. Two-piece balls have high initial speeds but relatively low spin rates, and hence perform well for drives and other shots made using woods, but do not perform as well for shots made with short irons where distance is less important and high spin rate is desirable.

Ball performance can be further modified, particularly the travel distance and the feel transmitted to the golfer through the club, by the addition of layers between the core and outer cover layer. A three-piece ball has one additional layer between the core and outer cover layer. Similarly, a four-piece ball results if two additional layers are introduced between the core and outer cover layer, and so on.

Golf ball core composition, and in particular polymer hardness, compression and resilience, is a significant factor that determines performance. Most golf ball core compositions are made from synthetic rubbers based on cis-1,4-polybutadiene, which often is crosslinked using crosslinking agents, such as sulfur or peroxides, often in combination with co-crosslinking agents such as zinc diacrylate. Alternatively, radiation may be employed as a crosslinking agent. The weight and hardness of the core may be further adjusted using filler materials.

Golf balls are becoming increasingly complex as new materials are developed that are useful for making balls. The golf ball business also is competitive, and as a result there is a great deal of literature concerning golf balls generally. For example, in 2005 more than 8,000 issued United States patents refer to golf balls in the specification.

B. Methods for Making Golf Balls

Golf balls typically are made by compression or injection molding. This is particularly true for golf ball cores. For example, Kim et al., U.S. Pat. No. 6,776,942 states that "cores can be made using either compression molding or injection molding processes (emphasis added)." As another example, Rajagopalan et al., U.S. Pat. No. 6,762,244 describes golf ball cores comprising thermoplastic compositions. The '244 patent states that the core compositions "may then be injection or compression molded during which time it is typically also heated to an activation temperature sufficient to facilitate crosslinking (emphasis added)."

Compression molding is perhaps the most common method used to prepare and crosslink polybutadiene in golf ball cores. To make golf ball cores comprising polybutadiene, all components of the core composition are combined to form a sticky composition that does not hold its shape and flows over time at room temperature (cold flows). This makes storage of such compositions problematic and thus requires that the cores be made directly from these compositions. In addition, these materials are inconvenient for injection molding processes. Typically, the polybutadiene composition is first extruded to form a slug. The slug is placed into a mold and subjected to a compression molding cycle comprising applying heat and pressure to crosslink the polymeric material. The core composition, and the temperature, pressure and duration of the molding cycle, all can be independently varied to control the resulting core properties.

Injection molding often is used to form cover layers over a core. The '942 patent alludes to this process stating that:

a core is placed inside a set of mold sections, and the mold sections are closed to form a spherical cavity around the core. A molten polymeric material is injected into the mold cavity under pressure through the gates. This polymeric material can be thermoplastic or chemically reactive; that is, the material can begin to react during or after molding and form crosslinks to harden (emphasis added).

Relative to compression molding, injection molding has rapid cycle times, potentially cheaper operating costs, and the capability of producing thinner layers about the core with closely controlled thickness variations, which is important for multi-layered balls having two or more intermediate layers between the core and cover.

Mixing thermoset rubber materials using an extruder also is known. Dalton, U.S. Pat. No. 6,508,724 states that:

Preferably, the blends are formed by first combining the thermoset rubber materials with the compatible, nonionic, modified polyolefins of this invention in, for example, a twin screw extruder, to produce an initial polymer blend. Other components of the mixture needed for cross linking, as described below, are then added to this first mixture. The formation of the core and the formation and application of the covers for a two-piece ball may then be performed using methods and equipment known in the art (emphasis added).

Similarly, Kim, U.S. Pat. No. 6,426,387 states, with reference to polybutadiene rubber cores, that "[t]he rubbers used in the present invention can be processed using any conventional mixing method, such as a Bambury mixer, calendaring, extrusion, or an internal mixer (emphasis added)." And, Kim, U.S. Pat. No. 6,878,075 states that "[t]he step of preparing a composition can comprise a step of dry-blending the composition, or a step of mixing the composition using a mill, internal mixer or extruder (emphasis added)." Thus, as currently understood, known methods mix rubber-based core materials, and extrude the mixture through a die to form a golf core preform, but thermoplastic-based core materials have not been extruded to form a golf ball core or core preform.

Compression molding and injection molding are not entirely satisfactory processes for making modern golf balls, particularly as additional polymeric compositions are developed that are useful for making golf balls having varying performance attributes. For example, compression molding techniques are convenient for making golf ball cores with a conventional rubber-based core composition. In general, a conventional rubber-based core composition is prepared by a batch compounding process using a Bambury mixer and a two-roll mill. Since it is a batch process, the batch size is limited by the machine capacity and it is difficult to avoid any variance from batch-to-batch.

Most thermoplastics are supplied as pellets or powders. These forms can be used to make golf ball cores using either compression molding techniques or injection molding techniques. But it is extremely difficult to control the compression molding process using pellets or powders. For example, it may be difficult to feed accurate amounts of the material into cavities, avoid spilling material outside the cavity, and hold the material in place until the mold is closed. It also is difficult to control the compression molding process to make a golf ball core without forming any voids inside the core, especially when pellets or powders are used. Adding any additional ingredients to the core composition, such as fillers, modifiers, and curatives during, also is difficult during the compression molding process.

It is possible to compound a core composition having all the ingredients and to make pellets with the compound for use in injection molding processes. But injection molding requires using complicated and expensive molds and associated structures that provide a significant barrier to process output and production efficiency. For example, an injection molding cycle comprises feeding material to the barrel; melting the material to form a melt; transferring the melt by rotating the screw and applying heat to the barrel; injecting the molten material to the mold cavities through a nozzle, sprue, runner, and gate(s); solidifying the material (usually by a cooling cycle); and opening the mold to obtain the finished part(s). Output capacity is determined by the number of cavities and the cycle time required to complete each injection molding cycle.

Conventional injection molding process commonly used for making golf balls may introduce imperfections in the molded golf ball. For example, weld lines may form when molten molding materials do not fuse completely. For injection molding, lines can form at gate contact points. Weld lines and lines formed by gates produce weak portions in the golf ball, which decrease their durability and alter ball performance.

Moreover, cores made by current injection molding processes often include microvoids, typically caused by entrapped gases that are not removed during the production process. Microvoids have deleterious effects both on the durability and performance of the golf ball.

The present invention provides a method for making golf balls, particularly golf ball cores, that address deficiencies encountered for compression molding and injection molding processes.

SUMMARY

Based on the Background, a need exists for a core-making process that combines the benefits of an extrusion process, typically used to compound a material for injection molding, and the compression molding process typically used to make a thermoset rubber core. The present invention provides a method that satisfies that need. Disclosed embodiments concern a process for extruding materials, now known or hereafter developed, that are useful for making golf ball cores, particularly a core composition comprising thermoplastic resins. The disclosed embodiments address problems associated with prior processes, such as operating costs, process efficiencies, limitations on the materials that can be used to form ball parts, the presence of microvoids, and/or other deleterious disadvantages.

One embodiment of the method for forming a golf ball core or core preform comprises extruding at least one thermoplastic, extrusion-processable polymeric material or polymer precursor material through a die. The process can be performed as a batch process, but preferably is performed as a substantially continuous process. The golf ball generally includes at least one additional layer about the core, such as an outer cover layer, and optionally at least one intermediate layer disposed between the core and the outer cover layer. Layers other than the core can be produced by compression molding, injection molding, reaction injection molding, coating, casting, dipping, or combinations thereof. Thus, the method typically comprises forming a composition comprising a composition useful for forming a golf ball core, such as at least one thermoplastic polymer or a polymer precursor material, extruding a golf ball core comprising the composition through a die, optionally forming at least one intermediate layer comprising a polymeric material about the core by compression molding or injection molding, and forming an outer cover layer comprising a polymeric material about the core and any intermediate layer(s) by compression molding, injection molding, reaction injection molding, coating, casting, dipping, or combinations thereof.

One benefit of extruding polymer cores or core preforms according to one described embodiment is the ability to compound core compositions at one time to include all materials desired in the core including, by way of example and without limitation, base resins, cross-linking agents, co-cross-linking agents, peptizers, accelerators, UV stabilizers, photostabilizers, photoinitiators, co-initiators, antioxidants, colorants, dispersants, mold release agents, processing aids, fillers, density adjusting fillers, nano-fillers, fibers, other materials now known or hereafter developed useful for making golf balls, and combinations thereof. Another benefit associated with certain disclosed embodiments for extruding polymer cores or core preforms comprises forming a first polymeric composition and subsequently modifying the composition. For example, the method may further comprise crosslinking an extruded core or core preform, such as during a subsequent compression molding step or by irradiation. Moreover, for extruded thermoplastics, cores or core preforms can be stored, and then softened, for example, for other modifications, such as making cores having different dimensions or densities, or further modifying the core or core perform compositions chemically, mechanically, radiationally, thermally, or combinations thereof. As another example, core preforms can be made that are particularly sized and shaped for subsequent processing by conventional methods, such as compression molding, and optionally stored prior to such subsequent processing.

As stated in the Background, known methods for making cores often produce microvoids. Another benefit of the presently disclosed embodiments is that extrusion processing can further comprise substantially degassing the polymeric material or polymer precursor material. Degassing can be achieved, for example, by subjecting the polymeric material or polymer precursor material to a vacuum, thereby producing a core substantially free of microvoids.

A person of ordinary skill in the art will appreciate that the present extrusion method can be used with any golf ball composition amenable to extrusion processing. For example, and without limitation, the polymeric material may be polyalkenamers, crosslinked polyalkenamers, synthetic rubbers, natural rubbers, thermoplastic polymers, or combinations thereof. Specific examples of classes of thermoplastic materials include, again without limitation, olefinic thermoplastic elastomers, metallocene catalyzed polymers, rubber-based thermoplastics, co-polyester thermoplastic elastomers, block copolymers comprising an aromatic vinyl group as a first block and a second block comprising a conjugated diene, polyamides, copolyamides, styrene block copolymers, functionalized styrenic block copolymers, polyesters, polyurethanes, ionomers, and combinations thereof. The polymeric material used to form the core, any intermediate layer, and/or an outer cover layer also can include any material now known or hereafter developed that is useful for making golf balls, including without limitation, cross-linking agents, co-cross-linking agents, peptizers, accelerators, UV stabilizers, photostabilizers, photoinitiators, co-initiators, antioxidants, colorants, dispersants, mold release agents, processing aids, fillers, density adjusting fillers, nano-fillers, fibers, nano-fibers, other materials now known or hereafter developed useful for making golf balls, and combinations thereof.

A person of ordinary skill in the art also will appreciate that extruding can be performed using any suitable extruder, including but not limited to, a ram extruder, a continuous-flow ram extruder, a gear-pump extruder, a single screw extruder, a twin screw extruder, or a multiple-screw extruder. Moreover, the process can be practiced using plural extruders as a system in a continuous or batch production process.

Embodiments of golf balls made by the method also are described. One disclosed embodiment comprises an extruded polymeric material or polymer precursor material, such as a thermoplastic core material, preferably substantially free of microvoids, optionally at least one intermediate layer and an outer cover layer comprising a polymeric material. The extruded core material, the polymeric material of any intermediate layer(s) and/or the outer cover layer may further comprise cross-linking agents, co-cross-linking agents, peptizers, accelerators, UV stabilizers, photostabilizers, photoinitiators, co-initiators, antioxidants, colorants, dispersants, mold release agents, processing aids, fillers, density adjusting fillers, nano-fillers, fibers, nano-fibers, other materials now known or hereafter developed useful for making golf balls, and combinations thereof. Cover layers may have any suitable composition, including without limitation, a reaction product of (a) diol(s), polyol(s), or combinations thereof; (b) diisocyanate(s), polisocyanate(s), or combinations thereof, (c) diamine(s), polyamine(s), or combinations thereof, or any combinations of (a), (b), and (c). Moreover, a cover layer may include a composition formed by a method comprising: (1) mixing at least one component A that is a monomer, oligomer, prepolymer, or polymer comprising at least 5% by weight of anionic functional groups; at least one component B that is a monomer, oligomer, prepolymer, or polymer comprising less by weight of anionic functional groups than the weight percentage of anionic functional groups of the at least one component A; and at least one component C that is a metal cation, thereby forming a first composition; and (2) melt-processing the first composition to produce a reaction product of the anionic functional groups of the at least one component A and the at least one component C to form the polymer blend composition, wherein the polymer blend composition incorporates an in-situ-formed pseudo-crosslinked network of the at least one component A in the presence of the at least one component B.

A disclosed embodiment of a three-piece golf ball comprises a core comprising an extruded polymeric material, particularly a thermoplastic polymeric material, often comprising a center portion, an intermediate layer comprising an injection or compression moldable composition, and an outer cover layer comprising an injection or compression moldable composition. The aforementioned injection or compression moldable composition including polymeric materials selected from thermoset polyurethanes, thermoplastic polyurethanes, metallocene catalyzed polymers, unimodal ionomers, bimodal ionomers, modified unimodal ionomers, modified bimodal ionomers, thermoplastic elastomers, polyolefins, polyalkenamers, polyesters, polyetheresters, polycarbonates, polyamides, polyetheramides, and any and all combinations thereof.

Similarly, an embodiment of a four-piece golf ball comprises an extruded polymeric core, particularly an extruded thermoplastic core, often comprising a center portion, an inner intermediate layer comprising an injection or compression moldable composition, such as a polymer selected from unimodal ionomers, bimodal ionomers, modified unimodal ionomers, modified bimodal ionomers, thermoset polyurethanes, thermoplastic polyurethanes, metallocene catalyzed polymers, thermoplastic elastomers, polyolefins, polyalkenamers, polyesters, polyetheresters, polycarbonates, polyamides, polyetheramides, and any and all combinations thereof, an outer intermediate layer comprising an injection or compression moldable composition, and an outer cover layer comprising an injection or compression moldable composition, such as a polymer selected from the group consisting of unimodal ionomers, bimodal ionomers, modified unimodal ionomers, modified bimodal ionomers, thermoset polyurethanes, thermoplastic polyurethanes, metallocene catalyzed polymers, thermoplastic elastomers, polyolefins, polyalkenamers, polyesters, polyetheresters, polycarbonates, polyanides, polyetheramides, and any and all combinations thereof. Disclosed golf ball embodiments may have a core comprising one or more core layers disposed about a core center. For such embodiments, the difference between a hardness of one core layer and the next adjacent core layer is greater than 2, preferably greater than 5, most preferably greater than 10 units of Shore D. Moreover, the hardness of the core may increase or decrease outwards from the center portion to an outer core layer.

The foregoing and other objects, features, and advantages of the invention will become more apparent from the following detailed description, which proceeds with reference to the accompanying figures.

DETAILED DESCRIPTION

I. Introduction and Definitions

Figure 1:
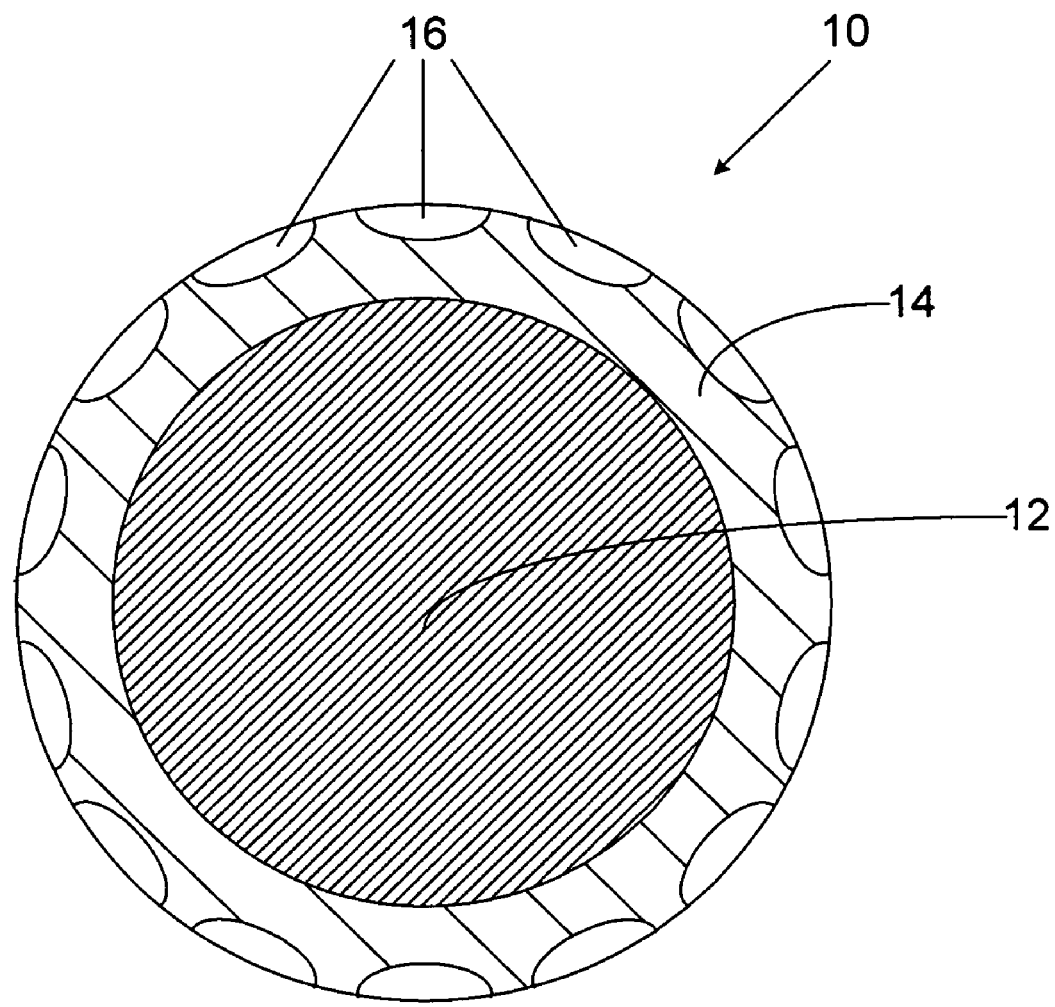
FIG. 1 is a schematic cross section of a two-piece golf ball.

The following definitions are provided to aid the reader, and are not intended to define terms to have a scope that would be narrower than would be understood by a person of ordinary skill in the art of golf ball composition and manufacture.

Any numerical values recited herein include all values from the lower value to the upper value. All possible combinations of numerical values between the lowest value and the highest value enumerated herein are expressly included in this application.

As used herein, the term "core" is intended to mean the elastic center of a golf ball, which may have a unitary construction. Alternatively the core itself may have a layered construction having a spherical "center" and additional "core layers," with such layers being made of the same material or a different material from the core center.

The term "cover" is meant to include any layer of a golf ball, which surrounds the core. Thus a golf ball cover may include both the outermost layer and also any intermediate layers, which are disposed between the golf ball center and outer cover layer. "Cover" may be used interchangeably with the term "cover layer".

The term "intermediate layer" may be used interchangeably with "mantle layer," "inner cover layer" or "inner cover" and is intended to mean any layer(s) in a golf ball disposed between the core and the outer cover layer.

The term "fully-interpenetrating network" refers to a network that includes two independent polymer components that penetrate each other, but are not covalently bonded to each other.

The term "semi-interpenetrating network" refers to a network that includes at least one polymer component that is linear or branched and interspersed in the network structure of at least one of the other polymer components.

The term "pseudo-crosslinked network" refers to materials that have crosslinking, but, unlike chemically vulcanized elastomers, pseudo-crosslinked networks are formed in-situ, not by covalent bonds, but instead by ionic clustering of the reacted functional groups, which clustering may disassociate at elevated temperatures.

In the case of a ball with two intermediate layers, the term "inner intermediate layer" may be used interchangeably herein with the terms "inner mantle" or "inner mantle layer" and is intended to mean the intermediate layer of the ball which is disposed nearest to the core.

Again, in the case of a ball with two intermediate layers, the term "outer intermediate layer" may be used interchangeably herein with the terms "outer mantle" or "outer mantle layer" and is intended to mean the intermediate layer of the ball which is disposed nearest to the outer cover layer.

The term "outer cover layer" is intended to mean the outermost cover layer of the golf ball on which, for example, the dimple pattern, paint and any writing, symbol, etc. is placed. If, in addition to the core, a golf ball comprises two or more cover layers, only the outermost layer is designated the outer cover layer. The remaining layers may be designated intermediate layers. The term outer cover layer is interchangeable with the term "outer cover".

The term "preform" typically refers to an extruded core that undergoes subsequent mechanical, thermal or chemical processing to form a final core, such as, by way of example and not limitation, physical changes in the shape or the dimension of the perform, crosslinking or composition modification by the addition of materials to the preform during an initial extrusion or subsequent to an initial extrusion step, and combinations thereof.

"Polymer precursor material" refers to any material that can be further processed to form a final polymer material of a manufactured golf ball, such as, by way of example and not limitation, monomers that can be polymerized during extrusion in a manner that does not preclude continued use of the extruder, or a material that can undergo additional processing, such as crosslinking, subsequent to an initial extrusion step.

The term "bimodal polymer" refers to a polymer comprising two main fractions and more specifically to the form of the polymer's molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymers molecular weight distribution curve, i.e., the molecular weight distribution curve for the total polymer product shows only a single maximum.

The term "polyalkenamer" is used interchangeably herein with the term "polyalkenamer rubber" and means a polymer of one or more alkenes, including cycloalkenes, having from 5-20, preferably 5-15, most preferably 5-12 ring carbon atoms. The polyalkenamers may be prepared by any suitable method including ring opening metathesis polymerization of one or more cycloalkenes in the presence of organometallic catalysts as described in U.S. Pat. Nos. 3,492,245, and 3,804,803, the entire contents of both of which are incorporated herein by reference.

A "thermoplastic material" is generally defined as a material that is capable of softening or fusing when heated and of hardening again when cooled. Thermoplastic polymer chains often are not cross-linked, but the term "thermoplastic" as used herein may refer to materials that initially act as thermoplastics, such as during an initial extrusion process, but which also may be crosslinked, such as during a compression molding step to form a final structure.

A "fiber" is a general term and the definition provided by Engineered Materials Handbook, Vol. 2, "Engineering Plastics", published by A.S.M. International, Metals Park, Ohio, USA, is relied upon to refer to filamentary materials with a finite length that is at least 100 times its diameter, which is typically 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned are also considered to be encompassed by the invention. Thus, the terms "fibers" and "fiber segments" are used herein. "Fibers or fiber segments" and "fiber elements" are used to encompass both fibers and fiber segments. Embodiments of the golf ball components described herein may include fibers, including without limitation, glass fibers, such as E fibers, Cem-Fil filament fibers, and 204 filament strand fibers, carbon fibers, such as graphite fibers, high modulus carbon fibers, and high strength carbon fibers, asbestos fibers, such as chrysotile and crocidolite, cellulose fibers; aramid fibers, such as Kevlar, including types PRD 29 and PRD 49, and metallic fibers, such as copper, high tensile steel, and stainless steel. In addition, single crystal fibers, potassium titanate fibers, calcium sulphate fibers, and fibers or filaments of one or more linear synthetic polymers such as Terylene, Dacron, Perlon, Orion, Nylon, including Nylon type 242, are contemplated. Polypropylene fibers, including monofilament and fibrillated fibers are also contemplated. Fibers used in golf ball components are described more fully in Kim et al. U.S. Pat. No. 6,012,991, which in incorporated herein by reference.

A "nanocomposite" is defined as a polymer matrix having nanofiller within the matrix. Nanocomposite materials and golf balls made comprising nanocomposite materials are disclosed in Kim et al., U.S. Pat. No. 6,794,447, and U.S. Pat. No. 5,962,553 to Ellsworth, U.S. Pat. No. 5,385,776 to Maxfield et al., and U.S. Pat. No. 4,894,411 to Okada et al., which are incorporated herein by reference in their entirety. Inorganic nanofiller materials generally are made from clay, and may be coated by a suitable compatibilizing agent, as discussed below in further detail. The compatibilizing agent allows for superior linkage between inorganic and organic material, and it also can account for the hydrophilic nature of the inorganic nanofiller material and the possibly hydrophobic nature of the polymer. Nanofiller particles typically, but not necessarily, are approximately 1 nanometer (nm) thick and from about 100 to about 1000 nm across, and hence have extremely high surface area, resulting in high reinforcement efficiency to the material at low loading levels of the particles. The sub-micron-sized particles enhance material properties, such as the stiffness of the material, without increasing its weight or opacity and without reducing the material's low-temperature toughness. Materials incorporating nanofiller materials can provide these property improvements at much lower densities than those incorporating conventional fillers.

Nanofillers can disperse within a polymer matrix in three ways. The nanofiller may stay undispersed within the polymer matrix. Undispersed nanofillers maintain platelet aggregates within the polymer matrix and have limited interaction with the polymer matrix. As the nanofiller disperses into the polymer matrix, the polymer chains penetrate into and separate the platelets. When viewed by transmission electron microscopy or x-ray diffraction, the platelet aggregates are expanded relative to undispersed nanofiller. Nanofillers at this dispersion level are referred to as being intercalated. A fully dispersed nanofiller is said to be exfoliated. An exfoliated nanofiller has the platelets fully dispersed throughout the polymer matrix; the platelets may be dispersed unevenly but preferably are dispersed substantially evenly.

Nanocomposite materials are materials incorporating from about 0.1% to about 20%, preferably from about 0.1% to about 15%, and most preferably from about 0.1% to about 10% nanofiller potentially reacted into and preferably substantially evenly dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer. When used in the manufacture of golf balls, nanocomposite materials can be blended effectively into ball compositions at a typical weight percentage, without limitation, of from about 1% to about 50% of the total composition used to make a golf ball component, such as a cover or core, by weight.

II. Golf Ball Composition and Construction

FIG. 1 illustrates a two-piece golf ball 10 comprising a solid center or core 12, and an outer cover layer 14. Golf balls also typically include plural dimples 16 formed in the outer cover and arranged in various desired patterns.

Figure 2:
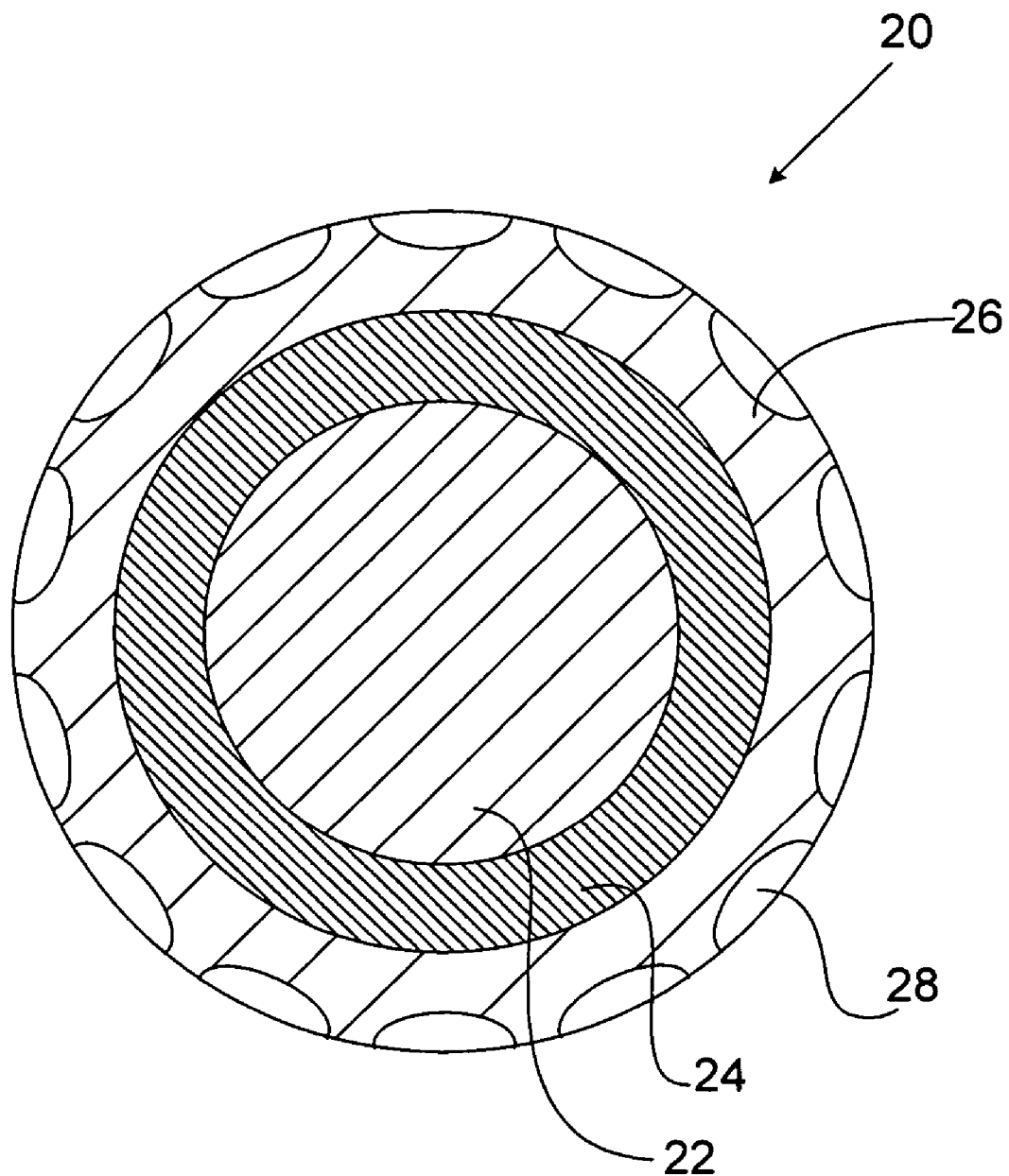
FIG. 2 is a schematic cross section of a three-piece golf ball.

FIG. 2 illustrates a 3-piece golf ball 20 comprising a core 22, an intermediate layer 24 and an outer cover layer 26. Golf ball 20 also typically includes plural dimples 28 formed in the outer cover layer 26 and arranged in various desired patterns. Although FIGS. 1 and 2 illustrate only two- and three-piece golf ball constructions, golf balls with additional layers also are included within the claimed embodiments.

The present invention can be used to form golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. Oversize golf balls with diameters above about 1.760 inches to as big as 2.75 inches are also within the scope of the invention.

A. Core

The core of the balls of the present invention have a diameter of from about 0.5 to about 1.62 inches, preferably from about 0.7 to about 1.60 inches, more preferably from about 1 to about 1.58 inches, yet more preferably from about 1.20 to about 1.54 inches, and most preferably from about 1.40 to about 1.52 inches.

The golf ball cores of the present invention also typically have a PGA compression of from about 30 to about 190, preferably from about 40 to about 160, typically from about 50 to about 130, and most preferably from about 60-100.

The Shore D hardness of the core center and core layers made according to the present invention may vary from about 20 to about 90, typically from about 30 to about 80, and even more typically from about 40 to about 70.

In one embodiment of the present invention the core may comprise an extrusion-processable polymeric material, such as an extrusion-processable thermoplastic material, and optionally, one or more additional layers disposed around the center as illustrated in FIG. 2. These additional layers may be made from the same composition as used in the center portion, or may be a different material.

B. Intermediate Layer(s) and Cover Layer

FIG. 2 illustrates an exemplary embodiment of a golf ball 20 comprising a core 22, formed in the shape of the sphere, an intermediate layer 24, disposed on the spherical core and an outer cover layer 26. The golf ball of the present invention may comprise from 0 to at least 5 intermediate layer(s), preferably from 0 to 3 intermediate layer(s), more preferably from 1 to 3 intermediate layer(s), and most preferably 1 to 2 intermediate layer(s).

In one preferred embodiment, the golf ball of the present invention is a three-piece ball having a core made using an extrusion-processable polymeric material.

In another preferred embodiment of the present invention, the golf ball of the present invention is a four-piece ball made using an extrusion-processable core composition.

The one or more intermediate layers of the golf balls of the present invention has a thickness of from about 0.01 to about 0.20 inch, preferably from about 0.02 to about 0.15 inch, more preferably from about 0.03 to about 0.10 inch and most preferably from about 0.03 to about 0.06 inch.

The one or more intermediate layers of the golf balls of the present invention also has a Shore D hardness greater than about 25, preferably greater than about 30, and typically greater than about 40.

The one or more intermediate layers of the golf balls of the present invention also has a flexural modulus from about 5 to about 500, preferably from about 15 to about 300, more preferably from about 20 to about 200, and most preferably from about 25 to about 100 kpsi.

The cover layer of the balls of the present invention has a thickness of from about 0.01 to about 0.10, preferably from about 0.02 to about 0.08, more preferably from about 0.04 to about 0.06 inch.

The cover layer of the balls of the present invention has a Shore D hardness of from about 30 to about 70, preferably from about 30 to about 65, more preferably from about 45 to about 60.

The COR of the golf balls of the present invention is greater than about 0.760, preferably greater than about 0.780, more preferably greater than about 0.790, and most preferably greater than about 0.800 at 125 ft/sec inbound velocity.

The COR of the golf balls of the present invention is greater than about 0.730, preferably greater than about 0.750, more preferably greater than about 0.770, and most preferably greater than about 0.790 at 143 ft/sec inbound velocity.

III. Polymeric Materials

Disclosed embodiments of the present invention particularly concern a method for making a golf ball whereby at least the core of the ball is manufactured using at least one extrusion processing step. Where a core is formed using at least one extrusion processing step, the process also may include forming any intermediate layer(s) and outer cover layer for a desired golf ball by compression molding, injection molding, reaction injection molding, coating, casting, dipping, or combinations thereof.

Any extrusion-processable material that is useful for forming a golf ball core or core preform that is now known or hereafter developed can be used in the process of the presently disclosed embodiments to manufacture a golf ball. One disclosed embodiment comprises extruding a core material, particularly a thermoplastic core material, or a thermoplastic material that subsequently may be converted into a thermoset material by subsequent processing, such as by applying elevated temperatures during a subsequent compression molding step.

The extrusion-processable core composition used to prepare the golf ball of the present invention material contains from about 1 to 100 wt %, preferably from about 20 to 100 wt %, more preferably from about 45 to 100 wt %, and even more preferably from about 75 to 100 wt % (based on the final weight of the extrusion-processable composition) of one or more polymers disclosed herein, typically a thermoplastic polymer. The polymers may be made by methods known to a person of ordinary skill in the art, or many may be obtained commercially.

The following materials are provided solely as examples of materials useful for forming golf ball cores, intermediate layers, and/or cover layers. A person of ordinary skill in the art will recognize that the present invention is not limited solely to those materials listed herein by way of example. Moreover, a person of ordinary skill in the art also will recognize that various combinations of such materials can be used to form the core, intermediate layer(s) and/or outer cover layer.

Additional guidance for selecting materials useful for making golf balls according to the disclosed embodiments is provided by considering those physical properties desirable for making golf balls. For example, in addition to the exemplary list of materials provided herein, a person of ordinary skill in the art might consider, for example in selecting an extrudable core material, the compression, hardness, density, the flexural modulus, elasticity, Coefficient of Restitution (C.O.R), impact durability, tensile properties, acoustic behavior, compatibility, processability, in view of the values stated for such properties, typical in the field, or that otherwise would be known to a person of ordinary skill in the field.

A. General Description of Polymeric Materials

Polymeric materials generally considered useful for making golf balls according to the process of the present invention include, without limitation, synthetic and natural rubbers, thermoset polymers such as thermoset polyurethanes and thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

More specific examples of particular polymeric materials useful for making golf ball cores, optional intermediate layer(s) and outer covers, again without limitation, are provided below.

B. Polyalkenamers

Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see Rubber Chem. & Tech., Vol. 47, page 511-596, 1974, which is incorporated herein by reference. Polyoctenamer rubbers are commercially available from Huls A G of Marl, Germany, and through its distributor in the U.S., Creanova Inc. of Somerset, N.J., and sold under the trademark VESTENAMEROR®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer for use in the practice of the invention has a trans content of approximately 80%, however, compounds having other ratios of the cis- and trans-isomeric forms of the polyalkenamer can also be obtained by blending available products for use in the invention.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5% to about 70%, preferably from about 6% to about 50%, more preferably from about from 6.5% to about 50%, even more preferably from about from 7% to about 45%, More preferably, the polyalkenamer rubber used in the present invention is a polymer prepared by polymerization of cyclooctene to form a trans-polyoctenamer rubber as a mixture of linear and cyclic macromolecules.

Prior to its use in the golf balls of the present invention, the polyalkenamer rubber may be further formulated with one or more of the following blend components:

1. Polyalkenamer Cross-Linking Agents

Any crosslinking or curing system typically used for rubber crosslinking may be used to crosslink the polyalkenamer rubber used in the present invention. Satisfactory crosslinking systems are based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl) benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R. T. Vanderbilt Co., Inc., of Norwalk, Conn.; and di-(2,4-dichlorobenzoyl)peroxide.

The cross-linking agents are blended with the polymeric material in effective amounts, which typically vary in total amounts of from about 0.05 part to about 5 parts, more preferably about 0.2 part to about 3 parts, and most preferably about 0.2 part to about 2 parts, by weight of the cross-linking agents per 100 parts by weight of the polyalkenamer rubber.

Each peroxide cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the polyalkenamer rubber composition to radiation also can serve as a cross-linking agent. Radiation can be applied to the polyalkenamer rubber mixture by any known method, including using microwave or gamma radiation, or an electron beam device. Additives may also be used to improve radiation-induced crosslinking of the polyalkenamer rubber.

2. Co-Cross-Linking Agent

The polyalkenamer rubber may also be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in the polyalkenamer rubber either as a preformed metal salt, or by introducing an $\alpha,\beta$-unsaturated carboxylic acid and a metal oxide or hydroxide into the polyalkenamer rubber composition, and allowing them to react to form the metal salt. The unsaturated carboxylic acid metal salt can be blended in any desired amount, but preferably in amounts of about 10 parts to about 100 parts by weight of the unsaturated carboxylic acid per 100 parts by weight of the polyalkenamer rubber.

3. Peptizer

The polyalkenamer rubber compositions used in the present invention also may incorporate one or more of the so-called "peptizers".

The peptizer preferably comprises an organic sulfur compound and/or its metal or non-metal salt. Examples of such organic sulfur compounds include, without limitation, thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4'dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include, without limitation, sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include, without limitation, ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

The peptizer, if employed to manufacture golf balls of the present invention, is present in an amount of from about 0.01 parts to about 10 parts by weight, preferably of from about 0.10 parts to about 7 parts by weight, more preferably of from about 0.15 parts to about 5 parts by weight per 100 parts by weight of the polyalkenamer rubber component.

4. Accelerators

The polyalkenamer rubber composition also can comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook: 13th* Edition (1990, R. T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The polyalkenamer rubber composition can further incorporate from about 0.1 part to about 10 parts by weight of the accelerator per 100 parts by weight of the polyalkenamer rubber. More preferably, the ball composition can further incorporate from about 0.2 part to about 5 parts, and most preferably from about 0.5 part to about 1.5 parts, by weight of the accelerator per 100 parts by weight of the polyalkenamer rubber.

C. Synthetic and Natural Rubbers

Traditional rubber components used in golf ball applications can be used to make golf balls according to the present invention including, without limitation, both natural and synthetic rubbers, such as cis-1,4-polybutadienes, trans-1,4-polybutadienes, 1,2-polybutadienes, cis-polyisoprenes, trans-polyisoprenes, polychloroprenes, polybutylenes, styrene-butadiene rubbers, styrene-butadiene-styrene block copolymers and partially and fully hydrogenated equivalents, styrene-isoprene-styrene block copolymers and partially and fully hydrogenated equivalents, nitrile rubbers, silicone rubbers, and polyurethanes, as well as mixtures of these materials. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be purchased, if commercially available, or synthesized by methods now known or hereafter developed, including using rare earth-based catalysts, nickel-based catalysts, or cobalt-based catalysts, that conventionally are used in this field. Polybutadiene obtained by using lanthanum rare earth-based catalysts usually employ a combination of a lanthanum rare earth (atomic number of 57 to 71) compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, and most preferably from about 2.2 to about 3.2. The polybutadiene rubbers have a Mooney viscosity ($ML_{1+4}$ (100° C.)) of from about −10 to about 80, preferably from about 20 to about 70, even more preferably from about 30 to about 60, and most preferably from about 35 to about 50. "Mooney viscosity" refers to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

Examples of 1,2-polybutadienes having differing tacticity, all of which are suitable as unsaturated polymers for use in the present invention, are atactic 1,2-polybutadienes, isotactic 1,2-polybutadienes, and syndiotactic 1,2-polybutadienes. Syndiotactic 1,2-polybutadienes having crystallinity suitable for use as an unsaturated polymer in compositions within the scope of the present invention are polymerized from a 1,2-addition of butadiene. Golf balls within the scope of the present invention include syndiotactic 1,2-polybutadienes having crystallinity and greater than about 70% of 1,2-bonds, more preferably greater than about 80% of 1,2-bonds, and most preferably greater than about 90% of 1,2-bonds. Also, golf balls within the scope of the present invention not only have such crystallinity but also have a mean molecular weight of between from about 10,000 to about 350,000, more preferably between from about 50,000 to about 300,000, more preferably between from about 80,000 to about 200,000, and most preferably between from about 10,000 to about 150,000. Examples of suitable syndiotactic 1,2-polybutadienes having crystallinity suitable for use in golf balls within the scope of the present invention are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

D. Thermoplastic Materials

1. Olefinic Thermoplastic Elastomers

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers. Examples of such polymers that are commercially available include products sold under the trade names SANTOPRENE, DYTRON, VISAFLEX, and VYRAM by Advanced Elastomeric Systems of Houston, Tex., and SARLINK by DSM of Haarlen, the Netherlands.

2. Co-Polyester Thermoplastic Elastomers

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

3. Other Thermoplastic Elastomers

Examples of other thermoplastic elastomers include multi-block, rubber-based copolymers, particularly those in which the rubber block component is based on butadiene, isoprene, or ethylene/butylene. The non-rubber repeating units of the copolymer may be derived from any suitable monomer, including meth(acrylate) esters, such as methyl methacrylate and cyclohexylmethacrylate, and vinyl arylenes, such as styrene. Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al., which is incorporated herein by reference. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block. Examples of styrenic copolymers include, without limitation, resins manufactured by Kraton Polymers (formerly of Shell Chemicals) under the trade names KRATON D (for styrene-butadiene-styrene and styrene-isoprene-styrene types), and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corporation.

Examples of other thermoplastic elastomers suitable as additional polymer components in the present invention include those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly(ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

4. Polyamides

Examples of polyamides within the scope of the present invention include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediarnine, 1,4-cyclohexyldiamine or m-xylylenediamine; (2) a ring-opening polymerization of cyclic lactam, such as $\epsilon$-caprolactam or $\omega$-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include polyamide 6; polyamide 11; polyamide 12; polyamide 4,6; polyamide 6,6; polyamide 6,9; polyamide 6,10; polyamide 6,12; PA12CX; PA12, IT; PPA; PA6, IT.

Non-limiting examples of suitable polyamides or copolymeric polyamides for use in the inner mantle and/or the outer mantle layer include those sold under the trademarks, PEBAX, CRISTAMID and RILSAN marketed by ATOFINA Chemicals of Philadelphia, Pa., GRILAMID marketed by EMS CHEMIE of Sumter, S.C., and ZYTEL marketed by E.I. DuPont de Nemours & Co. of Wilmington, Del.

5. Polyamide Elastomer

Examples of polyamide elastomers within the scope of the present invention include polyether amide elastomers, which result from the copolycondensation of polyamide blocks having reactive chain ends with polyether blocks having reactive chain ends, including: 1) polyamide blocks of diamine chain ends with polyoxyalkylene sequences of dicarboxylic chain ends; 2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and 3) polyamide blocks of dicarboxylic chain ends with polyether diols, the products obtained, in this particular case, being polyetheresteramides.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences preferably is between about 300 and about 15,000, and more preferably between about 600 and about 5,000. The molecular weight of the polyether sequences preferably is between about 100 and about 6,000, and more preferably between about 200 and about 3,000.

The amide block polyethers also may comprise randomly distributed units. These polymers may be prepared by the simultaneous reaction of polyether and precursor of polyamide blocks.

For example, the polyether diol may react with a lactam (or alpha-omega amino acid) and a diacid which limits the chain in the presence of water. A polymer is obtained having mainly polyether blocks, polyamide blocks of very variable length, but also the various reactive groups having reacted in a random manner and which are distributed statistically along the polymer chain.

Suitable amide block polyethers include, without limitation, those disclosed in U.S. Pat. Nos. 4,331,786, 4,115,475, 4,195,015, 4,839,441, 4,864,014, 4,230,838, and 4,332,920, which are incorporated herein in their entireties by reference. The polyether may be, for example, a polyethylene glycol (PEG), a polypropylene glycol (PPG), or a polytetramethylene glycol (PTMG), also designated as polytetrahydrofurane (PTHF).

The polyether blocks may be along the polymer chain in the form of diols or diamines. However, for reasons of simplification, they are designated PEG blocks, or PPG blocks, or also PTMG blocks.

It is also within the scope of the disclosed embodiments that the polyether block comprises different units such as units, which derive from ethylene glycol, propylene glycol, or tetramethylene glycol.

The amide block polyether comprises at least one type of polyamide block and one type of polyether block. Mixing two or more polymers with polyamide blocks and polyether blocks also may be used. It also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of about 1:1 to about 3:1.

One type of polyetherester elastomer is the family of Pebax, which are available from Elf-Atochem Company. Preferably, the choice can be made from among Pebax 2533, 3533, 4033, 1205, 7033, and 7233. Blends or combinations of Pebax 2533, 3533, 4033, 1205, 7033, and 7233 also can be prepared, as well. Pebax 2533 has a hardness of about 25 shore D (according to ASTM D-2240), a Flexural Modulus of about 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of about 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of about 67 kpsi (according to ASTM D-790). Pebax 7333 has a hardness of about 72 shore D (according to ASTM D-2240) and a Flexural Modulus of about 107 kpsi (according to ASTM D-790).

6. Thermoplastic Polyurethanes

Another example of an additional polymer component includes the thermoplastic polyurethanes, which are the reaction product of a diol or polyol and an isocyanate, with or without a chain extender. Thermoplastic polyurethanes are described in the patent literature, and some are known for use in making golf ball cores. See, for example, Vedula et al., U.S. Pat. No. 5,959,059.

Isocyanates used for making the urethanes of the present invention encompass diisocyanates and polyisocyanates. Examples of suitable isocyanates include the following: trimethylene diisocyanates, tetramethylene diisocyanates, pentamethylene diisocyanates, hexamethylene diisocyanates, ethylene diisocyanates, diethylidene diisocyanates, propylene diisocyanates, butylene diisocyanates, bitolylene diisocyanates, tolidine isocyanates, isophorone diisocyanates, dimeryl diisocyanates, dodecane-1,12-diisocyanates, 1,10-decamethylene diisocyanates, cyclohexylene-1,2-diisocyanates, 1-chlorobenzene-2,4-diisocyanates, furfurylidene diisocyanates, 2,4,4-trimethyl hexamethylene diisocyanates 2,2,4-trimethyl hexamethylene diisocyanates, dodecamethylene diisocyanates, 1,3cyclopentane diisocyanates, 1,3-cyclohexane diisocyanates, 1,3-cyclobutane diisocyanates, 1,4-cyclohexane diisocyanates, 4,4'-methylenebis(cyclohexyl isocyanates), 4,4'-methylenebis(phenyl isocyanates), 1-methyl-2,4-cyclohexane diisocyanates, 1-methyl-2,6-cyclohexane diisocyanates, 1,3-bis (isocyanato-methyl)cyclohexanes, 1,6-diisocyanato-2,2,4,4-tetra-methylhexanes, 1,6-diisocyanato-2,4,4-tetra-trimethylhexanes, trans-cyclohexane-1,4-diisocyanates, 3-isocyanato-methyl-3,5,5-trimethylcyclohexyl isocyanates, 1-isocyanato-3,3,5-trimethyl-5-isocyanatomethylcyclohexanes, cyclohexyl isocyanates, dicyclohexylmethane 4,4'-diisocyanates, 1,4-bis(isocyanatomethyl) cyclohexanes, m-phenylene diisocyanate, m-xylylene diisocyanate, m-tetramethylxylylene diisocyanates, p-phenylene diisocyanate, p,p'-biphenyl diisocyanates, 3,3'-dimethyl-4,4'-biphenylene diisocyanates, 3,3'-dimethoxy-4,4'-biphenylene diisocyanates, 3,3'-diphenyl-4,4'-biphenylene diisocyanates, 4,4'-biphenylene diisocyanates, 3,3'-dichloro-4,4'-biphenylene diisocyanates, 1,5-naphthalene diisocyanates, 4-chloro-1,3-phenylene diisocyanates, 1,5-tetrahydronaphthalene diisocyanates, meta-xylene diisocyanates, 2,4-toluene diisocyanates, 2,4'-diphenylmethane diisocyanates, 2,4-chlorophenylene diisocyanates, 4,4'-diphenylmethane diisocyanates, p,p'-diphenylmethane diisocyanate, 2,4-tolylene diisocyanates, 2,6-tolylene diisocyanates, 2,2-diphenylpropane-4,4'-diisocyanate, 4,4'-toluidine diisocyanates, dianisidine diisocyanates, 4,4'-diphenyl ether diisocyanates, 1,3-xylylene diisocyanates, 1,4-naphthylene diisocyanates, azobenzene-4,4'-diisocyanates, diphenyl sulfone-4,4'-diisocyanates, triphenylmethane 4,4',4''-triisocyanates, isocyanatoethyl methacrylates, 3-isopropenyl-α,α-dimethylbenzyl-isocyanates, dichlorohexamethylene diisocyanates, ω,ω'-diisocyanato-1,4-diethylbenzenes, polymethylene polyphenylene polyisocyanates, polybutylene diisocyanates, isocyanurate modified compounds, and carbodiimide modified compounds, as well as biuret modified compounds of the above polyisocyanates. Each isocyanate may be used either alone or in combination with one or more other isocyanates. These isocyanate mixtures can include triisocyanates, such as biuret of hexamethylene diisocyanate and triphenylmethane triisocyanate, and polyisocyanates, such as polymeric diphenylmethane diisocyanate.

Polyols used for making the polyurethane in the copolymer include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly (diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of E-caprolactone, and polyol obtained by opening the ring of β-methyl-δ-valerolactone with ethylene glycol can be used either alone or in a combination thereof. Additionally, polyester polyols may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. A polyether polyol may be used either alone or in a mixture.

Polycarbonate polyols are obtained by the condensation of a known polyol (polyhydric alcohol) with phosgene, chloroformic acid ester, dialkyl carbonate or diallyl carbonate. A particularly preferred polycarbonate polyol contains a polyol component using 1,6-hexanediol, 1,4-butanediol, 1,3-butanediol, neopentylglycol or 1,5-pentanediol. A polycarbonate polyol can be used either alone or in a mixture.

Polybutadiene polyols include liquid diene polymer containing hydroxyl groups, and an average of at least 1.7 functional groups, and may be composed of diene polymers or diene copolymers having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant. A polybutadiene polyol can be used either alone or in a mixture.

Urethanes used to practice the present invention also may incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Suitable polyamines that may be used as chain extenders include primary, secondary and tertiary amines; polyamines have two or more amines as functional groups. Examples of these include: aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as 4,4'-methylene bis-2-chloroaniline, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol. Aromatic diamines have a tendency to provide a stiffer (i.e., having a higher Mooney viscosity) product than aliphatic or cycloaliphatic diamines. A chain extender may be used either alone or in a mixture.

7. Ethylenically Unsaturated Thermoplastic Elastomers

Another family of thermoplastic elastomers for use in the golf balls of the present invention are polymers of (i) ethylene and/or an alpha olefin; and (ii) an α,β-ethylenically unsaturated $C_3$-$C_{20}$ carboxylic acid or anhydride, or an α,β-ethylenically unsaturated $C_3$-$C_{20}$ sulfonic acid or anhydride or an α,β-ethylenically unsaturated $C_3$-$C_{20}$ phosphoric acid or anhydride and, optionally iii) a $C_1$-$C_{10}$ ester of an α,β-ethylenically unsaturated $C_3$-$C_{20}$ carboxylic acid or a $C_1$-$C_{10}$ ester of an α,β-ethylenically unsaturated $C_3$-$C_{20}$ sulfonic acid or a $C_1$-$C_{10}$ ester of an uoL-ethylenically unsaturated $C_3$-$C_{20}$ phosphoric acid.

Preferably, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred. Preferably, the carboxylic acid ester of if present may be selected from the group consisting of vinyl esters of aliphatic carboxylic acids wherein the acids have 2 to 10 carbon atoms and vinyl ethers wherein the alkyl groups contain 1 to 10 carbon atoms.

Examples of such polymers suitable for use as include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Most preferred are ethylene/(meth)acrylic acid copolymers and ethylene/(meth)acrylic acid/alkyl (meth)acrylate terpolymers, or ethylene and/or propylene maleic anhydride copolymers and terpolymers.

The acid content of the polymer may contain anywhere from 1 to 30 percent by weight acid. In some instances, it is preferable to utilize a high acid copolymer (i.e., a copolymer containing greater than 16% by weight acid, preferably from about 17 to about 25 weight percent acid, and more preferably about 20 weight percent acid).

Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311 and 4608 series of ethylene-acrylic acid copolymers sold by The Dow Chemical Company, Midland, Mich.

Also included are the bimodal ethylene/carboxylic acid polymers as described in U.S. Pat. No. 6,562,906, the entire contents of which are herein incorporated by reference. These polymers comprise ethylene/α,β-ethylenically unsaturated $C_{3-8}$ carboxylic acid high copolymers, particularly ethylene (meth)acrylic acid copolymers and ethylene, alkyl (meth) acrylate, (meth)acrylic acid terpolymers, having molecular weights of about 80,000 to about 500,000 which are melt blended with ethylene/α,β-ethylenically unsaturated $C_{3-8}$ carboxylic acid copolymers, particularly ethylene/(meth) acrylic acid copolymers having molecular weights of about 2,000 to about 30,000.

8. Ionomers

The core, cover layer and, optionally, one or more inner cover layers golf ball embodiments of the present invention may further comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272 (the entire contents of which are herein incorporated by reference). Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester also may be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of, for example, formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it also was well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 weight percent to about 35 weight percent in the polymer. Generally, such a high acid ionomer will have a flexural modulus from about 50,000 psi to about 125,000 psi.

Ionomer resins further comprising a softening comonomer, present from about 10 weight percent to about 50 weight percent in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ α,β-ethylenically unsaturated carboxylic acid, such as acrylic or methacrylic acid, and is present in an amount from about 2 to about 30 weight percent of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight percent of the E/X/Y copolymer, and wherein the acid groups present in said ionomeric polymer are partially neutralized with a metal selected from the group consisting of zinc, sodium, lithium, calcium, magnesium, and combinations thereof.

E/X/Y, where E is ethylene, X is a softening comonomer such as present in an amount of from 0 weight percent to about 50 weight percent of the polymer, and Y is present in an amount from about 5 weight percent to about 35 weight percent of the polymer, and wherein the acid moiety is neutralized from about 1% to about 90% to form an ionomer with a cation such as lithium, sodium, potassium, magnesium, calcium, barium, lead, tin, zinc or aluminum, or a combination of such cations.

The ionomer also may be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, zinc, calcium, magnesium, and a mixture of any these; and a low molecular weight component having a molecular weight of from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers are prepared by mixing:

an ionomeric polymer comprising ethylene, from 5 to 25 weight percent (meth)acrylic acid, and from 0 to 40 weight percent of a (meth)acrylate monomer, the ionomeric polymer neutralized with metal ions selected from the group consisting of lithium, sodium, zinc, calcium, magnesium, and a mixture of any these, and from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing:

a. a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, zinc, calcium, potassium, magnesium, and a mixture of any of these;

b. a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, zinc, calcium, potassium, magnesium, and a mixture of any of these; and c. from about 5 to about 40 weight percent (based on the total weight of said modified ionomeric polymer) of one or more fatty acids or metal salts of the fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_x COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to, stearic acid ($C_{18}$, i.e., $CH_3(CH_2)_{16}COOH$), palmitic acid ($C_{16}$, i.e., $CH_3(CH_2)_{14}COOH$), pelargonic acid ($C_9$, i.e., $CH_3(CH_2)_7 COOH$) and lauric acid ($C_{12}$, i.e., $CH_3(CH_2)_{10}OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3(CH_2)_7 CH:CH(CH_2)_7 COOH$).

The source of the metal ions used to produce the metal salts of the fatty or waxy acid salts used in the various modified ionomers are generally various metal salts, which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of the fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

IV. Fillers

The polymeric compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber. In another preferred embodiment the filler comprises one or more so called nanofillers, as described in U.S. Pat. No. 6,794,447 and copending U.S. patent application Ser. No. 10/670,090 filed on Sep. 24, 2003 and copending U.S. patent application Ser. No. 10/926,509 filed on Aug. 25, 2004, the entire contents of each of which are incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

As mentioned above, the nanofiller particles have an aggregate structure with the aggregates particle sizes in the micron range and above. However, these aggregates have a stacked plate structure with the individual platelets being roughly from about 1 nanometer (nm) thick and from about 100 to about 1000 nm across. As a result, nanofillers have extremely high surface area, resulting in high reinforcement efficiency to the material at low loading levels of the particles. The sub-micron-sized particles enhance the stiffness of the material, without increasing its weight or opacity and without reducing the material's low-temperature toughness.

Nanofillers when added into a matrix polymer, such as the polyalkenamer rubber, can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a 3% to 5% clay loading and has a tensile strength of 11,800 psi and a specific gravity of 1.14, while a conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

For the polyalkenamers, the nanofiller material is added in an amount of from about 0.1% to about 20%, preferably from about 0.1% to about 15%, and most preferably from about 0.1% to about 10% by weight of nanofiller reacted into and substantially dispersed through intercalation or exfoliation into the structure of the polyalkenamer.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls.

Another particularly well-suited additive for use in the compositions of the present invention includes compounds having the general formula:

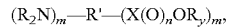

where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. Provisional Patent Application No. 60/588,603, filed on Jul. 16, 2004, the entire contents of which are incorporated herein by reference. These materials include, without limitation, caprolactam, oenantholactam, decanolactam, undecanolactam, dodecanolactam, caproic 6-amino acid, 11-aminoundecanoicacid, 12-aminododecanoic acid, diamine hexamethylene salts of adipic acid, azeleic acid, sebacic acid and 1,12-dodecanoic acid and the diamine nonamethylene salt of adipic acid, 2-aminocinnamic acid, L-aspartic acid, 5-aminosalicylic acid, aminobutyric acid; aminocaproic acid; aminocapryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbomanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogensulfate; aminonaphthalenesulfonic acid; aminotoluene sulfonic acid; 4,4'-methylene-bis-(cyclohexylamine)carbamate and ammonium carbamate.

Most preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoicacid, 12-aminododecanoic acid, epsilon-caprolactam; omega-caprolactam, and any and all combinations thereof.

In an especially preferred embodiment a nanofiller additive component in the golf ball of the present invention is surface modified with a compatibilizing agent comprising the earlier described compounds having the general formula:

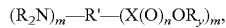

$(R_2N)_m—R'—(X(O)_nOR_y)_m$,

A most preferred embodiment would be a filler comprising a nanofiller clay material surface modified with an amono acid including 12-aminododecanoic acid. Such fillers are available from Nanonocor Co. under the tradename Nanomer 1.24TL.

Golf ball components may, in addition to the materials specifically described herein, include other materials, such as UV stabilizers, photostabilizers, photoinitiators, co-initiators, antioxidants, colorants, dispersants, mold release agents, processing aids, inorganic fillers, organic fillers, and combinations of such materials.

V. Method for Making Disclosed Embodiments

A. Extrusion Generally

Extrusion is a process by which a material is forced to flow in a more or less continuous manner through a die to produce a desired shape and cross section for the product extruded, referred to herein as an extrudate or preform. Material to be extruded, such as the polymeric materials, or polymeric precursor materials, such as monomeric materials, described herein for forming golf ball components, are first loaded into a hopper or a material storage unit. The material, or combinations of materials, to be extruded may be provided in various physical forms, such as pellets, powder, liquid, strand, strip, paste, and combinations thereof.

Desired materials are fed into a feed chamber and the material moved through the feed chamber by actuating a screw drive. The feed chamber may be, and typically is, a heated chamber. Polymeric material, or polymeric precursor material, such as monomers or polymers that may be crosslinked after the extrusion process, initially generally at substantially ambient temperature, typically changes into a molten stream by compression forces applied by the screw, heat applied by a heater, including external heater(s) in the barrel, and viscous flow friction. The increased pressure forces the molten polymeric material or polymeric precursor material through an adapter and into and out of a small opening, called a die, having a desired selectable shape and size. The shape may be that substantially corresponding to a finished ball component, such as substantially spherical, or in a some other predetermined shape suitable for a downstream process, such as, for example, shaped to conform to a mold used in a subsequent compression molding step.

One benefit of the presently disclosed extrusion process is that it can be a substantially continuous process that avoids having to reuse or form molds, such as with injection molding processes. Thus, extruded material may be fed continuously onto a conveyor belt.

Extruded polymeric material may be allowed to cool before further processing, if any is desired or necessary. Cooling may result simply from radiant heat transfer, or the extrusion system may include a cooling area, such as a chamber that includes blowers or a fluid immersion chamber, such as a water immersion chamber. Alternatively, in a continuous, multi-step process, the extruded material may be directly transferred to a subsequent processing step or device.

There are many different types of extruders available, such as ram extruders, continuous-flow ram extruders, gear-pump extruders, single screw extruders, twin screw extruders, multiple-screw extruders, either with hot-feed or cold-feed. Any of these general types of extruders may be used to extrude golf ball components, such as cores. Moreover, depending upon the needs and process design, any of these general types of extruders may be combined to form a system to make the product.

Generally extruders include a main feeder, a side feeder, a liquid injector, a motor drive, a gear-pump, a barrel, a vent, a vacuum, a screw, a breaker plate, die, etc. A twin-screw extruder may have non-intermeshing screws, intermeshing co-rotating screws, or intermeshing counter-rotating screws. Screws may be solid or cored. Screws also can be one piece or composed of multiple screw elements to form screw zone(s). Screws can have different sections, such as feed, compression or transition, mixing, and metering sections, or any combination of these. Screws can accommodate extruder designs that use venting, degassing, or vacuum zones to remove entrapped air, volatile constituents, etc. from the melt before it is extruded through the die. Screws are characterized by their L/D ratio, which typically range from about 16:1 to about 40:1.

B. Profile Extrusion for Golf Ball Core

1. Material

To applicants' knowledge, golf ball cores have not been made by extrusion processes with thermoplastics. Thus, one aspect of the disclosed method comprises extruding golf ball cores, or core performs that may require additional processing, comprising polymeric materials, or polymeric precursor materials, suitable for making golf ball cores, including without limitation the materials disclosed herein. Typically, but not necessarily, the core composition comprises at least one thermoplastic resin. Multiple different polymeric compositions also can be used to make suitable ball cores. Moreover, the core composition optionally may further comprise fibers and/or fillers useful for making golf ball cores that are now known or hereafter developed, such as the materials described herein, with core compositions often including specific gravity adjusting filler(s), organic, inorganic, or metallic filler(s), nano-filler(s), nano-fibers, processing aids, anti-oxidants, cross-linking agents, co-cross-linking agents, peptizers, accelerators, UV stabilizers, photostabilizers, photoinitiators, co-initiators, antioxidants, colorants, dispersants, mold release agents, processing aids, colorants, etc., and combinations of such materials.

2. Extrusion

Golf ball compositions, particularly thermoplastic golf ball compositions, are fed into the extruder. The extrudate extruded through the die has a pre-determined shape. The extrudate cross-section can be any desired shape, including without limitation, circle, oval, triangle, rectangle, square, pentagons, hexagone, octagone, or any polygonal shape. Cubic or spherical extrudes may be best accommodated by post extrusion processing, such as compression molds. The extrudate has any suitable length, such as may be sufficient to make a single embodiment of particular golf ball components, such as a core, or to make multiple components, such as multiple cores when cut, such as a profile, or profile with predetermined, 3-dimensional shapes either interconnected or disconnected form.

During the extrusion process, the polymeric material and other ingredients are fed into the extruder by main feeder(s), side-feeder(s), liquid-injector(s), another extruder(s), or combinations of these materials. Multiple extrusions, as needed or desired, can be performed to make the core composition before making the core or core preform.

During the extrusion process, the polymeric material may be degassed under atmospheric pressure or a vacuum. Optionally, any foreign materials or impurities are filtered by the screen pack in a breaker plate, which is located between the barrel and the die.

In certain embodiments, the extrudate is cooled and/or cut as needed after it exits the die, to be transferred to subsequent processing steps, such as cutting, compression molding, etc. Subsequent processing steps can be used to form a golf ball component, such as a core, including compression in a compression molding machine to make a core. During the compression molding step, additional chemical processing of the extrudate may occur, such as crosslinking of the polymeric material. Any other post-cure process now employed to make golf balls, or hereafter developed for the same purpose, can be applied to golf ball components processed as described herein, particularly post extrusion processing that is desirable for forming golf ball cores, including without limitation, post curing processing that includes applying thermal energy, irradiation, or both. Moreover, to form multiple layer golf balls, any process for forming intermediate layers and outer cover layers now known or hereafter developed can be used to make final balls having multiple layers.

C. Extrusion Processing Benefits

Extrusion processing according to the disclosed embodiments of the present invention provides significant benefits relative to conventional golf ball processing. For example, since the resin is thermoplastic, extruded thermoplastic cores are easier to handle, the thermoplastic composition can be modified, blended, and/or recycled compared to conventional processes that are used to form rubber cores. Any pre-form made from the thermoplastic can be stored for subsequent processing, unlike thermoset materials. Compression molding may not be necessary, if the core is formed during the extrusion process, right after the die, and it may not be necessary to cure the extruded polymeric material.

Disclosed embodiments of the extrusion process also provide advantages relative to injection molding process. The present extrusion process is amenable to continuous processing, as it avoids, for example, the use of the mold systems required for injection molding, and hence a large number of components can be made. Injection molding output is limited by the number of cavities available for injection molding. Injection molding requires making separate, expensive molding cavities, as well as the attendant sprues and runners. And, simply by changing the die, the shape and/or dimensions of the extruded pre-form can be controlled, whereas injection molding requires redesigning and producing the injection molds. It also is possible to make different cores or core-preforms having different size or specific gravity even with the same extrudate.

The extrusion process also allows removal of entrapped air or volatiles that may be evolved or entrapped during the extrusion process, such as by the application of a vacuum. This substantially reduces, or eliminates, voids in the core, pre-form, or profile. As described in the Background, microvoids often occur in compression or injection molded materials, which directly relates to the durability and/or performance of the core or golf ball.

D. Additional Processing Following Extrusion

The ability to extrusion process compositions according to the present invention provides considerable flexibility for manufacturing individual golf ball components and final balls. For instance, the core may be formed by first extrusion molding desired polymeric formulations, followed by a subsequent compression-molding step with or without initiating a crosslinking reaction of the core composition. The molding and/or cure conditions in this compression step would depend on the formulation of the polymeric composition selected.

Finished golf balls may be prepared by initially forming a core or a core pre-form in an extrusion process with or without combination of any post core-forming process, followed by forming the intermediate or cover layer sequentially over the core by various methods such as cold-runner injection molding, hot-runner injection molding, compression molding, reaction injection molding, casting, coating, or combination thereof, to produce layers of the required thickness and ultimately golf balls of the required diameter. A variety of conventional mold designs can be used to form an intermediate and/or cover layer(s), such as injection mold with a various configurations of cavities, runner(s), gate(s), retractable pin(s), fixed pin(s), mold cavities with a various surface modification or treatment, mold cavities with various types of protrusions, mold and mold cavities with various types of material(s), or any combinations of those. If any further chemical modification or reaction is necessary, using a heated injection mold, heated compression mold, or irradiation allows the temperature to be controlled sufficiently to either partially or fully crosslink the material to yield the desired layer properties. If the material is partially cured, additional compression molding or irradiation steps optionally may be employed to complete the curing process to yield the desired layer properties.

Alternatively, intermediate and/or cover layers may be formed around the extruded core and/or intermediate layer(s) followed by a compression molding the half shells about the core and/or intermediate layer(s) to effect the curing of the layers in the final ball.

Outer or intermediate covers also may be formed around the cores with or without a fuirther crosslinking reaction by cold-runner injection molding, hot-runner injection molding, co-injection molding, reaction injection molding, compression molding, transfer molding, liquid coating, powder coating, liquid dipping, dipping fluidized bath, casting, or any combination thereof.

In addition, if radiation is used to cross-link, then the mixture comprising the crosslinkable polymer and any other additives can be irradiated following mixing, during forming into a part such as the core, intermediate layer, or outer cover of a ball, or after forming such part.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims. The extrudate may have any desired shape and dimensions and the material comes out from the extruder continuously.

We claim:

1. A golf ball, comprising:
   an extruded thermoplastic core material substantially free of microvoids;
   at least one intermediate cover layer comprising a $C_5$-$C_{12}$ cyclic polyalkenamer selected from the group consisting of polypentenamers, polyheptenamers, polyhexenamers, polyoctenamers, polydecenamers, polydodecenamers, and all combinations thereof; and
   an outer cover layer comprising a polymeric material formed by a method comprising mixing at least one component A that is a monomer, oligomer, prepolymer, or polymer comprising at least 5% by weight of anionic functional groups; at least one component B that is a monomer, oligomer, prepolymer, or polymer comprising less by weight of anionic functional groups than the weight percentage of anionic functional groups of the at least one component A; and at least one component C that is a metal cation, thereby forming a first composition; and melt-processing the first composition to produce a reaction product of the anionic functional groups of the at least one component A and the at least one component C to form a polymer blend composition, wherein the polymer blend composition incorporates an in-situ-formed pseudo-crosslinked network of the at least one component A in the presence of the at least one component B.

2. The golf ball according to claim 1 where the polyalkenamer comprises from about 70% to about 90% of its double bonds in the trans-configuration, has a molecular weight from about 50,000 to about 150,000 (as measured by GPC), a degree of crystallization from about 7% to about 45%, (as measured by DSC secondary fusion), has a viscosity (measured by at DMA) at 200° C. of less than about 1,000 Pa-sec, and has a storage modulus (G') (measured by DMA) at 1 Hz and 25° C. of greater than about $2 \times 10^8$ dyn/cm².

3. The golf ball according to claim 1 where the thermoplastic core material or the intermediate cover layer further comprises an additional polymer selected from the group consisting of synthetic and natural rubbers, thermoset polyurethanes and thermoset polyureas, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, polyphenylene oxide, polyphenylene sulfide, diallyl phthalate polymer, polyimides, polyvinyl chloride, polyamide-ionomer, polyurethane-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, a compound having a general formula $(R_2N)_m$—R'—$(X(O)_nOR_y)_m$, wherein R is selected from the group consisting of hydrogen, one or more $C_1$-$C_{20}$ aliphatic systems, one or more cycloaliphatic systems, one or more aromatic systems, R' is a bridging group comprising one or more unsubstituted $C_1$-$C_{20}$ straight chain or branched aliphatic or alicyclic groups, one or more substituted straight chain or branched aliphatic or alicyclic groups, one or more aromatic groups, one or more oligomers each containing up to 12 repeating units, and when X is C or S or P, m is 1-3, when X=C, n=1 and y=1, when X=S, n=2 and y=1, and when X=P, n=2 and y=2, and any and all combinations of such materials.

4. The golf ball according to claim 1 where the thermoplastic material of the core, the polymeric material of the at least one intermediate layer and/or the outer cover layer further comprises a cross-linking agent selected from sulfur compounds, peroxides, azides, maleimides, a co-cross-linking agent comprising zinc or magnesium salts of an unsaturated fatty acid having from about 3 to about 8 carbon atoms, a base resin, a peptizer, an accelerator, a UV stabilizer, a photostabilizer, a photoinitiator, a co-initiator, an antioxidant, a colorant, a dispersant, a mold release agent, a processing aid, a fiber, a filler including a density adjusting filler, a nano-filler, an inorganic filler, an organic filler, and combinations thereof.

5. The golf ball according to claim 1 comprising a four piece golf ball comprising:
   the extruded thermoplastic core material;
   the at least one intermediate layer;
   an outer intermediate layer comprising an injection moldable composition; and
   the outer cover layer.

6. The golf ball according to claim 5 where the outer intermediate layer comprises a polyalkenamer of a $C_5$-$C_{20}$ cyclic olefin having from about 50 to about 99% of its double bonds in the trans-configuration, a molecular weight from about 10,000 to about 300,000 (as measured by GPC), a degree of crystallization of from about 5 to about 70% (as measured by DSC secondary fusion), a viscosity (measured by at DMA) at 200° C. of less than about 5,000 Pa-sec, and a storage modulus (G') (measured by DMA) at 1 Hz and at 25° C. of greater than about $1 \times 10^7$ dyn/cm².

7. The golf ball according to claim 5 where the core further comprises one or more layers disposed around the center and having a difference between a hardness of one layer and the next adjacent layer of greater than 2 units of Shore D.

8. The golf ball according to claim 1 where the thermoplastic core material is selected from olefinic thermoplastic elastomers, metallocene catalyzed polymers, rubber-based thermoplastics, co-polyester thermoplastic elastomers, block copolymers comprising an aromatic vinyl group as a first block and a second block comprising a conjugated diene, polyamides, copolyamides, styrene block copolymers, functionalized styrenic block copolymers, polyesters, polyurethanes, ionomers, and combinations thereof.

9. A three-piece golf ball having:
   a core comprising an extruded thermoplastic;
   an intermediate layer comprising an injection or compression moldable composition;
   an outer cover layer comprising a polymer selected from thermoset polyurethanes, thermoplastic polyurethanes, metallocene catalyzed polymers, unimodal ionomers, bimodal ionomers, modified unimodal ionomers, modified bimodal ionomers, thermoplastic elastomers, polyolefins, polyalkenamers, polyesters, polyetheresters, polycarbonates, polyamides, polyetheramides, and any and all combinations thereof; and where the intermediate layer comprises a polyalkenamer of a $C_5$-$C_{20}$ cyclic olefin containing from about 50% to about 99% of its double bonds in the trans-configuration, having a molecular weight from about 10,000 to about 300,000 (as measured by GPC), a degree of crystallization from about 5% to about 70% (as measured by DSC secondary fusion), a viscosity (measured by at DMA) at 200° C. of less than about 5,000 Pa-sec, and a storage modulus (G') (measured by DMA) at 1 Hz and at 25° C. of greater than about $1 \times 10^7$ dyn/cm$^2$.

10. The golf ball according to claim 9 where the outer cover layer further comprises a compound having a general formula $(R_2N)_m$—$R'$—$(X(O)_nOR_y)_m$, where R is selected from the group consisting of hydrogen, one or more $C_1$-$C_{20}$ aliphatic systems, one or more cycloaliphatic systems, one or more aromatic systems, or R' is a bridging group comprising one or more unsubstituted $C_1$-$C_{20}$ straight chain or branched aliphatic or alicyclic groups, one or more substituted straight chain or branched aliphatic or alicyclic groups, one or more aromatic groups, one or more oligomers each containing up to 12 repeating units, and when X is C or S or P, m is 1-3, when X=C, n=1 and y=1, when X=S, n=2 and y=1, and when X=P, n=2 and y=2.

11. The golf ball according to claim 9 where the outer cover layer comprises a cover composition formed by a method comprising:

mixing at least one component A that is a monomer, oligomer, prepolymer, or polymer comprising at least 5% by weight of anionic functional groups; at least one component B that is a monomer, oligomer, prepolymer, or polymer comprising less by weight of anionic functional groups than the weight percentage of anionic functional groups of the at least one component A; and at least one component C that is a metal cation, thereby forming a first composition, and melt-processing the first composition to produce a reaction product of the anionic functional groups of the at least one component A and the at least one component C to form the polymer blend composition, wherein the polymer blend composition incorporates an in-situ-formed pseudo-crosslinked network of the at least one component A in the presence of the at least one component B.

12. The golf ball of claim 11 wherein the at least one component A comprises between about 5% and about 50% by weight of anionic functional groups.

13. The golf ball of claim 11 wherein the anionic functional groups of the at least one component A comprises sulfonic acid, phosphoric acid, carboxylic acid, or esters of these.

14. The golf ball of claim 11 wherein the at least one component A comprises a homopolymer, a copolymer, a terpolymer, or mixtures thereof.

15. The golf ball of claim 11, wherein the at least one component A comprises a terpolymer of: (1) an α-olefin having the form RCH=CH$_2$, where R is a radical selected from the class consisting of hydrogen and alkyl radicals having 1 to 8 carbon atoms; (2) an α-β-ethylenically unsaturated carboxylic acid having preferably 3 to 8 carbon atoms; and (3) an acrylate ester having from 1 to 21 carbon atoms.

16. The golf ball of claim 11, wherein the at least one component B comprises a triblock copolymer having (a) a first polymer block comprising an aromatic vinyl compound; (b) a second polymer block comprising a diene compound; and (c) a hydroxyl group located at a block copolymer; or a hydrogenation product of the triblock copolymer, or mixtures thereof.

17. The golf ball of claim 11, wherein the at least one component C blended in the step of blending together comprises lithium, sodium, magnesium, aluminum, potassium, calcium, manganese, tungsten, titanium, iron, cobalt, nickel, hafnium, copper, zinc, barium, zirconium, or tin.

* * * * *